March 14, 1944. A. E. PAGE 2,344,450
VIBRATORY FEED CONTROL MECHANISM
Filed May 15, 1943
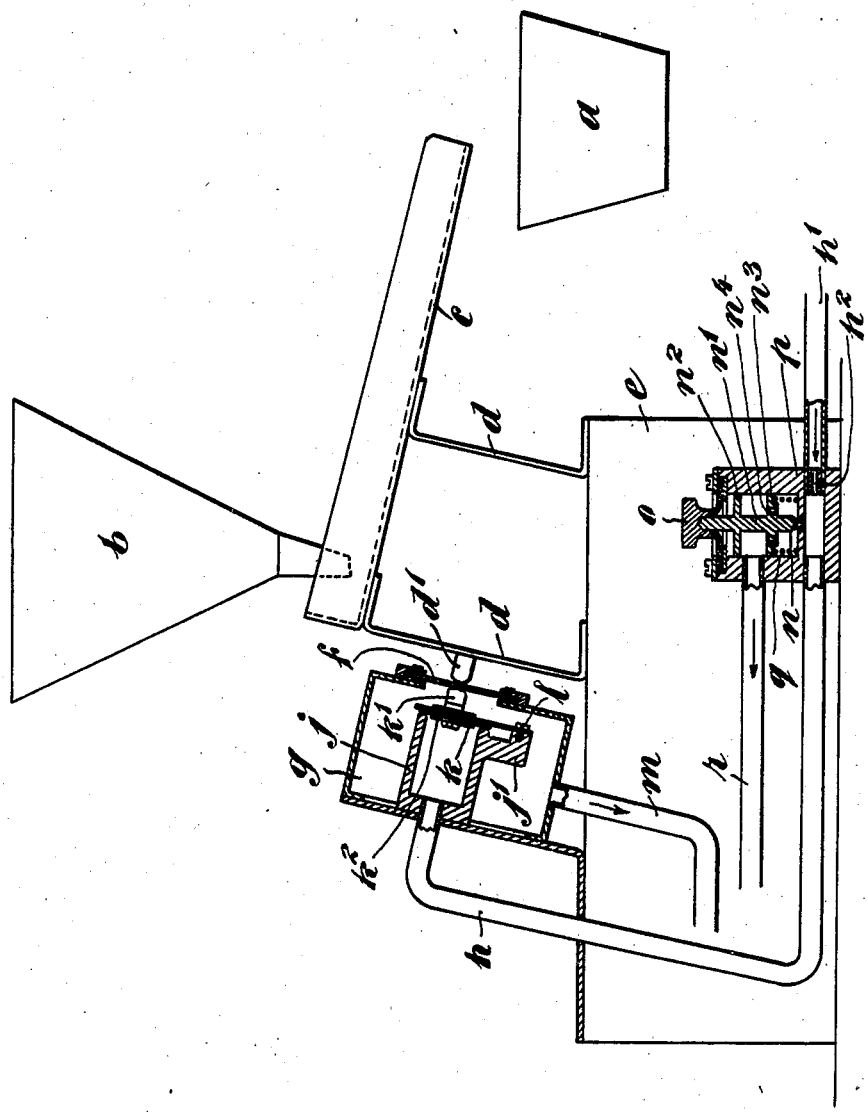
Alfred Ernest Page
Inventor
by Marshall & Marshall
Attorneys Patented Mar. 14, 1944

2,344,450

UNITED STATES PATENT OFFICE 2,344,450

VIBRATORY FEED CONTROL MECHANISM

Alfred Ernest Page, Birmingham, England, assignor to W. & T. Avery Limited, Birmingham, England Application May 15, 1943, Serial No. 487,083
In Great Britain April 16, 1942

6 Claims. (Cl. 198—220)

This invention has reference to improvements in vibratory feed control mechanism associated with a pneumatic control of the feed supply, and has for one of its primary objects the provision of an improved control mechanism for powdered or farinaceous material which is required to be accurately weighed or measured in relatively small quantities, say for example the supply of a powder into a container where a very high degree of accuracy is essential, and where it is a desideratum to speed up the weighing or measuring operation without sacrificing the accuracy of the weighment or measurement.

The invention consists of a vibratory control mechanism associated with a pneumatic control of the feed supply, characterised by the pneumatic pressure being released through a reed valve, said valve having connection to a feed plate which is vibrated in consonance with the said pressure release to deliver material deposited on the plate. The invention further resides in the means of controlling the release of the air pressure in the supply line, and in the means of communicating vibratory motion resulting from such release to the flexible or resilient mounting of the feed plate or delivery chute.

The invention will now be described with particular reference to the accompanying diagrammatic illustration which is a part sectional elevation through a mechanism associated with a pneumatic control feed supply which is adapted to feed powdered or farinaceous material into a container, which container may represent the goods pan of a weighing apparatus, a measuring receptacle, or a bucket adapted to be mounted on a conveyor.

In this illustration of the invention, it may be assumed that the container $a$ is the goods pan of a weighing scale for weighing small quantities of a powdery material. The powdery material is fed into a supply hopper $b$ located above an inclined chute or trough $c$ which is resiliently mounted by means of a pair of flexure plates $d$ on the base or frame $e$ of the machine; protruding from one of the said flexure plates is a button $d^1$ adapted to contact the centre of a thin flexible disc $f$ which forms the closure of an exhaust box $g$. Within this box is located the outer end of a pipe line $h$ through which air under pressure is supplied and delivered into the exhaust box $g$; the outer end of this pipe line within the exhaust box is formed as or connected to a cylinder $j$ of greater internal diameter than that of the bore of the pipe $h$ and this cylinder is closed at its outer end by a reed valve which takes the form of a thin diaphragm $k$ provided with a resilient seating $k^2$. The diaphragm is fixed at the one end by means of a setscrew $l$ to the lug $j^1$ on the cylinder $j$, the diaphragm being free at its opposite end; thus the resilient seating $k^2$ is maintained in contact with the outlet end of the cylinder $j$ so as to provide a closure for the cylinder due to the inherent elasticity and resilience of the diaphragm $k$ and the seating disc $k^2$. This diaphragm is provided about the middle of its outer face with a button $k^1$ which is adapted to contact the inner surface of the thin flexible disc $f$ which forms the closure for the exhaust box $g$, this button $k^1$ being aligned with the button $d^1$ on one of the flexure plates $d$ forming part of the flexible mounting of the feed chute or delivery trough $c$.

An exhaust pipe $m$ extends from the exhaust box $g$ to atmosphere and in the pipe line $h$ there is provided an air control valve $n$ having a spring-controlled press button release $o$ which is adapted for manual or automatic operation. The valve $n$ is of conical formation formed at the lower extremity of the valve stem $n^1$ which is provided with a pair of circular guide discs $n^2$ and $n^3$, which admit of the required location of the valve within the valve cylinder $p$, the lower disc $n^3$ being provided with a plurality of apertures $n^4$ therethrough. The coiled compression spring $q$ normally tends to maintain the valve $n$ off its seating in the base of the valve casing $p$ thereby permitting air under pressure entering through the run $h^1$ of the supply pipe $h$ to pass through a restricted orifice $h^2$ and thence via the apertures $n^4$ in the disc $n^3$ to atmosphere through the pipe line $r$. When however pressure is applied to the press button release $o$ against the pressure exerted by the coiled spring $q$ then the valve $n$ is maintained on its seating within the base of the cylinder $p$ and the whole of the air supply entering through the pipe $h^1$ passes directly into the pipe line $h$ and thence into the cylinder $j$ to perform the operation to be hereinafter more particularly described.

Located below the delivery end of the feed chute or trough $c$ is a scale pan $a$ or other receptive container for the powder, and the amount of the powdery material supplied to this pan or container is weighed or measured against any known form of weighing resistant or measurement control, so that an observation or indication can be obtained when the requisite amount of material has been delivered to the pan or container $a$ from the chute or trough $c$, which delivery obtains and continues throughout the period that the button o is depressed to close the valve n and thus to ensure that the air supply under pressure entering through the pipeline $hh^1$ is directed to the reed valve which forms a hinged closure for the outlet of the cylinder j. The air thus directed and released through the reed valve causes minute rapid vibrations of the reed valve which vibrations are transmitted through the button $k^1$ mounted on this reed through the thin flexible disc f forming the closure of the exhaust box g to the aligned button $d^1$ projecting from one of the flexure plates d; thus material delivered on to the chute or trough c from the supply hopper b is projected along and down the chute or trough and delivered over the outer or lower edge thereof into the receptacle a.

It should be appreciated that the moment the push button o controlling the air supply valve is released the feed supply of powder ceases due to the reduction which obtains in the air pressure in the pipe line h, and it will be obvious that instead of employing a manual control of the valve n that the weighing scale or measuring device or the conveyor may be utilised to automatically control the operation of this valve so that when the requisite quantity of material has been delivered to the scale pan or container a the air supply valve is released to ensure an immediate cessation of the supply of powder from the delivery chute c.

It should further be appreciated that the rate of the feed supply of the powder or other material is determined by the periodicity or speed of the minute vibrations which are imparted to the delivery chute or trough and this periodicity or speed can be varied by adjusting the position of the contact button $d^1$ on the flexure plate d so as to afford a greater or lesser degree of vibration.

Due to the use of a reed valve to admit of the release of the compressed air into the exhaust box g a note is emitted at all times when delivery is taking place and thus an audible indication is afforded to the operator or overseer. The air under pressure admitted to the exhaust box g is released to atmosphere through the outlet or exhaust pipe m.

It will be understood that various constructional modifications can be made in the mechanism without departing from the scope of the present invention, for instance the cylinder j may be located external on but in communication with the exhaust box g and the button $d^1$ may extend through and form an associated part of the flexible diaphragm f; this button could then have connection or contact with the resilient support d for the feed plate c. In the last indicated modification the free end of the button $k^1$ would have direct contact with the button $d^1$.

It will be appreciated that it is not essential for the feed plate to have the downward inclination shown in the accompanying diagram as efficient operation may obtain when the base of this plate has a horizontal disposition.

I claim:

1. A vibratory control mechanism associated with a pneumatic control of feed supply for powdery or farinaceous materials, comprising a valve controlled supply pipe line, a cylinder into which air under pressure is emitted from the pipe line, a reed valve controlling the outlet from the said cylinder, an exhaust box containing said cylinder and reed valve, a flexible diaphragm forming a closure wall of the exhaust box, means mounted on the reed valve for transmitting the vibratory motions of the reed valve to the said diaphragm, and means for transmitting the vibratory motions of the diaphragm to a flexible support for a feed plate.

2. A vibratory control mechanism associated with a pneumatic control of a feed supply for powdery or farinaceous materials according to claim 1, wherein the reed valve is formed as a hinged closure member for the outlet end of the cylinder connected to the air supply pipe, said reed valve having a resilient seating thereon and forming a part thereof.

3. A vibratory control mechanism associated with a pneumatic control of a feed supply for powdery or farinaceous materials, comprising a valve controlled supply pipe line, a cylinder into which air under pressure is emitted from the pipe line, a hingedly mounted reed valve controlling the outlet from the said cylinder, an exhaust box containing the said cylinder and reed valve provided with a flexible wall, a button mounted on the reed valve forming a contact with the inner surface of the said wall, an aligned button connecting the outer face of the said wall, a flexible support connected to the last-mentioned button, and a feed plate mounted on said support whereby rapid minute vibratory motions are communicated to the said plate, for the purpose herein set forth.

4. A vibratory control mechanism according to claim 3, having in combination therewith a supply hopper adapted to deposit material on the feed plate, and a receptive container adapted to receive material delivered from the said plate.

5. A vibratory control mechanism associated with a pneumatic control of a feed supply, comprising a supply pipe line, a valve adapted for manipulative control against a spring resistant located in said pipe-line, a cylinder into which air under pressure is emitted from the pipe-line, a reed valve controlling the outlet from the said cylinder, an exhaust chamber containing said cylinder and reed valve, a flexible diaphragm forming the closure for the exhaust chamber, means for transmitting the vibratory motions of the reed valve to the flexible diaphragm, and means for transmitting vibrations of the flexible diaphragm to a flexible support, a feed plate mounted on the flexible support, a supply hopper mounted above the feed plate, and a receptive container mounted below said feed plate.

6. A vibratory feed control mechanism comprising a pressure chamber having an aperture, a resilient leaf mounted at one of its ends, extending substantially in the plane of said aperture and obstructing said aperture, and a resiliently mounted feeder connected with said leaf to be actuated by vibrations set up in said leaf by the exhausting of fluid from said pressure chamber through said aperture.

ALFRED ERNEST PAGE.